United States Patent [19]
Dotti et al.

[11] 4,269,224
[45] May 26, 1981

[54] COMBINED FLUID LOGIC CONTROL DEVICE

[75] Inventors: Giulio Dotti, Turin; Antonino Bertone, Sant'Antonino; Bruno Roggero, Cinaglio, all of Italy

[73] Assignee: Centro Ricerche Fiat S.p.A., Orbassano, Italy

[21] Appl. No.: 54,512

[22] Filed: Jul. 3, 1979

[30] Foreign Application Priority Data

Jul. 12, 1978 [IT] Italy .................. 68646 A/78

[51] Int. Cl.³ .................................. F15B 13/06
[52] U.S. Cl. ..................... 137/596.15; 91/536; 137/596.16
[58] Field of Search ............ 137/596.15, 596.16; 91/536

[56] References Cited

U.S. PATENT DOCUMENTS 3,973,595  8/1976  Schmoll .............. 137/596.15 X

Primary Examiner—Gerald A. Michalsky
Attorney, Agent, or Firm—Sughrue, Rothwell, Mion, Zinn & Macpeak

[57] ABSTRACT

A fluid control device for the selective control of at least one group of three movable members each displaceable between a first working position and a second working position, and each having a rest position intermediate between the first and the second working position includes, for each group of three movable members, a group of three hydraulic control units, each control unit being intended to control a respective movable member, and control means for controlling the feeding of a fluid under pressure coming from a feed source to each of the three feed ducts of each group of three control units.

10 Claims, 10 Drawing Figures

COMBINED FLUID LOGIC CONTROL DEVICE

The present invention relates to a fluid control device, for the selective control of at least one group of three movable members each displaceable between a first working position and a second working position, and each having a rest position intermediate between the first and the second working position.

The fluid control device according to the invention is characterised by the fact that:

(a) the said fluid control device includes, for each group of three movable members, a group of three control units, each control unit being intended to control a respective movable member, (b) each control unit includes a fixed body provided internally with a cylindrical cavity closed at its ends, a first piston element rigidly connected to the movable member controlled by the said control unit, and a second piston element; the two said piston elements being slidably mounted within the cavity of the fixed body in such a way as to define three principal chambers within the said cavity: a first principal chamber between the two piston elements, a second principal chamber adjacent only the first piston element, and a third principal chamber adjacent only the second piston element, each control unit being moreover provided with a first, a second and a third feed inlet, respectively communicating with the first, the second and the third principal chamber, (c) the two piston elements of each control unit are formed in such a way that each control unit controls in a first active operating condition, corresponding to one of seven different feed conditions of fluid under pressure to one or more of the three feed inlets, a displacement of the respective movable member towards its first working position, and in a second active operating condition, corresponding to another of the said seven different feed conditions, a displacement of the respective movable member towards its second working position; each hydraulic control unit being operable to maintain the respective movable member in its rest position in the passive operating conditions corresponding to the other five possible feed conditions of fluid under pressure to the three feed inlets, (d) each group of three control units is provided with a first, a second and a third feed duct each of which is connected both to the first feed inlet of one of the three units of the group of three, and to the second feed inlet of another unit of the group of three and to the third feed inlet of the remaining unit of the group of three; each feed inlet of each control unit being connected only with one of the three said feed ducts, (e) there are provided control means for controlling the feeding of a fluid under pressure coming from a feed source to each of the three feed ducts of each group of three control units; the said control means being operable to allow the feeding of fluid under pressure to, or the discharge of fluid under pressure from, each of the three feed ducts of each of the three control units.

The device according to the invention can be applied advantageously in a case in which it is desired to control selectively each group of three movable members in such a way as to cause from time to time the displacement towards one of the two working positions of only one of the three movable members of each group of three. Since each movable member has two working positions each group of three movable members is therefore susceptible to being controlled according to six different operative conditions (which become seven taking into account the operative condition which occurs when all three movable members are in their rest positions).

The device according to the invention allows, thanks to the characteristic specified above, such selective controls of each group of three movable members, to be obtained simply.

By means of the said control means it is possible in fact to feed fluid under pressure to one or more of the three feed ducts of each group of three control units according to the seven possible combinations (calling A, B, C respectively the first, second and third feed ducts of each group of three control units, the said seven combinations are: A,B,C,AB,BC,AC,ABC).

Thanks to the above mentioned connections existing between the three feed ducts of each group of three control units and the three feed inlets of each control unit, in correspondence with the seven different combinations according to which fluid under pressure can be fed to the said three feed ducts, there occur, for each control unit, the above mentioned seven operating conditions (two active and five passive) corresponding to the seven different combinations according to which fluid can be fed under pressure to one or more of the three feed inlets of each control unit.

In correspondence with each of the seven different combinations according to which fluid under pressure can be fed to the three feed ducts of each group of three control units only one of the three control units can be in its active operating condition at any one time, in such a way as to cause the displacement of the respective movable member towards one of its working positions; the other two control units of the group of three are each in one of their five passive operating conditions.

Therefore, by feeding fluid under pressure to the three feed ducts of each group of three control units according to the said seven different combinations, only one of the three corresponding movable members can be displaced towards one of its two working positions at any one time; one of the said feed conditions being able to maintain all three of the movable members in their rest positions.

In a first embodiment of the present invention, which relates to the case in which the device of the invention is intended selectively to control only a single group of three movable members, the said device is further characterised by the fact that the said control means include a group of three valves each of which is provided with an inlet duct connected to the said feed source, a discharge duct and an output duct; each valve being moreover provided with a control member for putting into communication, in a first operative condition of the control member, the output duct and the discharge duct of the said valve, and, in a second operative condition of the control member, the inlet duct and the output duct of the said valve, the three output ducts of the three valves being respectively connected to the first, second and third feed ducts of the single group of three control units.

In a second embodiment of the invention, which relates to the case in which the device of the invention is intended for the selective control of a plurality of groups of three movable members, the said device is further characterised by the fact that the said control means include a group of three valves each of which is provided with an inlet duct connected to the feed source, a discharge duct and an output duct; each valve being moreover provided with a control member for putting into communication, in a first operative condition of the control member, the output duct and the discharge duct of the said valve, and, in a second operative condition of the control member, the inlet duct and the output duct of the said valve; the said control means including moreover a distributor member, connected to the three output ducts of the three valves and to the three feed ducts of each group of three control units, and able selectively to put in communication the three output ducts of the three valves with the three feed ducts of one of the groups of three control units.

Each of the movable members can be for example constituted by a distributor valve able to allow fluid from a source of fluid under pressure to be fed to a first outlet duct in its first operating position, and to a second outlet duct in its second operating position.

Therefore, by acting on the control members of the said three valves, in the case where there is only a single group of three movable members, or by acting on both the control members of the said three valves and on the control members of the said distributor members, in the case where there are a plurality of groups of three movable members, it is possible, at any one time, to direct the fluid under pressure to one only of the said output ducts controlled by the various distributor valves.

Another preferred characteristic of the device according to the present invention resides in the fact that the said three valves are solenoid valves and that the control member of each solenoid valve is constituted by a coil connected in an electrical control circuit.

In the case where there are more than one group of three movable members, the distributor member can be constituted, for each additional group of three, by a distributor valve controlled by means of a solenoid valve fed from the said source of fluid under pressure and connected to the said distributor valve for the control of this latter.

Preferably, the fluid control device according to the present invention is further characterised by the fact that:

(a) the first piston element is provided centrally, on its end surface adjacent the second principal chamber, with a cylindrical axial appendage slidable in a portion of restricted diameter of the cylindrical cavity of the fixed body of the said hydraulic control unit, this piston element being moreover provided centrally, on its outer end surface which is adjacent to the first principal chamber, with a second axial appendage in the form of an axial cylindrical stem, opposite the first appendage and having a first portion of greater diameter, adjacent the said first piston element, and a second portion of smaller diameter; the said first piston element being moreover provided with an axial duct extending from the free end of the said cylindrical appendage to the free end of the said cylindrical stem, (b) the second piston element includes a first portion of smaller diameter, adjacent to the first principal chamber, and a second portion of greater diameter, the said portions being slidable respectively in two contiguous portions of different diameters of the said cylindrical cavity of the fixed body; this second piston element being moreover provided centrally with an axial cylindrical duct having two portions of different diameter, within which are slidable, respectively, the said two portions of the cylindrical stem of the other, first piston element; the free end of the said cylindrical stem of the first piston element being disposed outside the second piston element slidable on it, and being provided with a stop collar able to come into contact with the end surface of this second piston element;

(c) the axial stroke of the second piston element with respect to the body and the axial stroke of the first piston element with respect to the second piston element are equal to the axial stroke which the respective movable member must make to carry it from its rest position to one of its two working positions, (d) the values of the areas of the active surfaces of the two piston elements which are intended to come into contact with fluid under pressure are chosen in such a way that each hydraulic control unit in its said first active operating condition causes a displacement of the respective movable member towards its first working position, in its said active operating condition causes a displacement of the respective movable member towards its second working position, and in its other five passive operating conditions maintains the respective movable member in or moves it to its rest position.

Further characteristics and advantages of the present invention will become apparent from the following description with reference to the attached drawings, provided purely by way of non limitative example, in which.

In the exemplary embodiments of the device according to the invention which are illustrated in the accompanying drawings each of the said movable members is constituted by a distributor valve operable to feed fluid from a source of fluid under pressure to a first outlet duct in its first working position and to a second outlet duct in its second working position, each distributor valve being operable to direct fluid under pressure to a discharge duct in its rest position.

Figure 1:
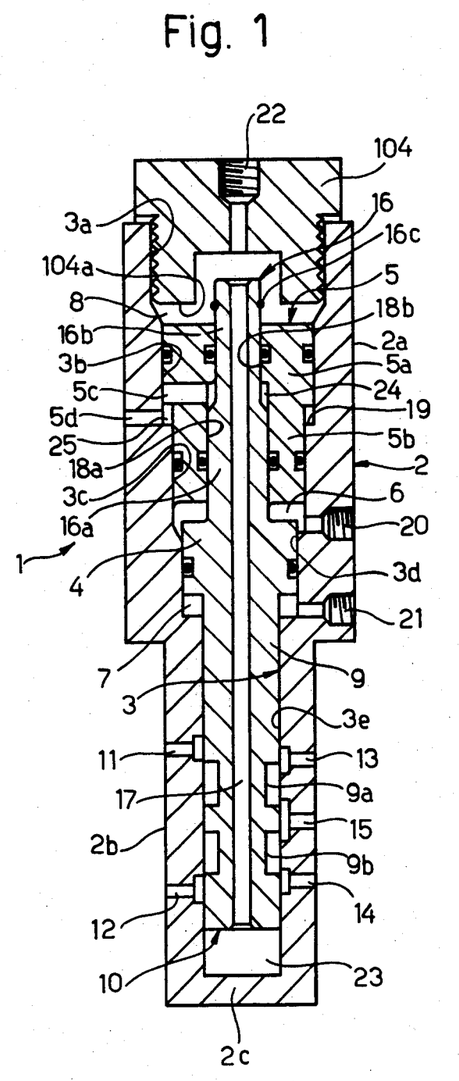
FIG. 1 illustrates in longitudinal section a control unit utilised in a fluid control device according to the invention.

In FIG. 1, with 1 is indicated in its entirety one of the control units utilised in the device according to the present invention. The control unit 1 comprises a fixed body 2 in which is incorporated the distributor valve intended to be controlled by this control unit.

The fixed body 2 is constituted by an elongate cylindrical body having a portion 2a of a greater diameter and a portion 2b of smaller diameter. Within the cylindrical body 2 is formed an axial cylindrical cavity 3 closed at one end by a wall 2c integral with the fixed body 2. At the opposite end the cylindrical cavity 3 is closed by means of a closure plug 104 screwed into a threaded portion 3a of the cylindrical cavity 3.

The cylindrical cavity 3 comprises four contiguous portions 3b, 3c, 3d, 3e having circular sections with diameters successively decreasing from the portion 3b which is adjacent the end portion 3a.

Within the cylindrical cavity 3 of the fixed body 2 of each control unit 1 are slidable a first piston element 4 and a second piston element 5.

The first piston element 4 is slidable in the portion 3d of the cylindrical cavity 3; the second piston element 5 has two portions 5a, 5b of different diameter, respectively slidable within the portions 3b, 3c of the cylindrical cavity 3. In this way the two piston elements 4, 5, define, within the cylindrical cavity 3, three principal chambers: a first principal chamber 6 lying between the two piston elements, a second principal chamber 7 adjacent only the first piston element 4, and a third principal chamber 8 adjacent only the second piston element 5.

The first piston element 4 is provided centrally, on its end face adjacent the second principal chamber 7 with a cylindrical axial appendage 9 which is integral with a distributor valve 10.

The cylindrical axial appendage 9 is slidable within the portion 3e of the cylindrical cavity 3.

In the portion 2b of the fixed body 2 are formed two feed inlets 11, 12 intended to be connected to a source of fluid under pressure, two outlets 13, 14 intended to be connected respectively to a first and a second outlet duct, and an outlet 15 intended to be connected to a discharge duct. The distributor valve 9 is provided, in a known way, with a pair of peripheral grooves 9a, 9b for selectively connecting the feed inlet 11 with the outlet 13 or the feed inlet 12 with the outlet 14. In FIG. 1 the distributor valve 9 is illustrated in its rest position; the two said connections take place when the distributor valve 9 is moved respectively to a first working position, in which the groove 9a comes between the inlet 11 and the outlet 13, or to a second working position, in which the groove 9b comes between the inlet 12 and the outlet 14.

The first piston element 4 is provided centrally, on its end surface adjacent the first principal chamber 6, with a second axial appendage in the form of a cylindrical stem 16, opposite the appendage 9 and having a first portion 16a of greater diameter adjacent to the piston element 4 and a second portion 16b of smaller diameter.

The first piston element 4 is moveover provided with an axial duct 17 which extends from the free end of the said axial stem 16 to the free end of the said cylindrical appendage 9.

The second piston element 5 is provided centrally with an axial cylindrical duct having two portions 18a, 18b of different diameter within which are respectively slidable the said two portions 16a, 16b of the cylindrical stem 16 of the first piston element 4; the free end of the cylindrical stem 16 is disposed outside the second piston element 5 and is provided with a stop ring 16c able to come into contact with the surface of the end of the second piston element 5 which is adjacent the third principal chamber 8.

Although in FIG. 1 the second piston element 5 is constituted by a single piece, this second piston element could also be constituted by two different elements as illustrated in FIGS. 2 to 8.

Both the first piston element 4 and the second piston element 5 are provided with sealing members of known type to allow the fluid fed to the control unit 1 to be sealed in the various chambers within the fixed body 2.

The axial stroke of the second piston element 5 is limited at the top by the inner surface of the end 104a of the closure plug 104 and at the bottom end by the annular shoulder 19 which joins the two contiguous portions 3b, 3c of the inner cavity of the fixed body 2.

The axial stroke of the first piston element 4 is limited at the top by the end surface of the second piston element 5 which is adjacent to the first principal chamber 6 and at the bottom by the stop ring 16c intended to contact the end surface of the second piston element 5 which is adjacent to the third principal chamber 8.

The axial strokes of the piston elements 4 and 5 respectively in relation to the fixed body 2 and the second piston element 5 are equal to half of the axial stroke which the distributor valve 10 must make to move from its rest position to one of its two working positions. This means that the distributor valve 10 can attain one of its two working positions, towards the top or towards the bottom respectively, only if both the piston elements 4, 5 are in their upper or their lower end positions respectively. When, on the other hand, the two piston elements 4, 5 move in opposite senses in reaching their end positions, the distributor valve 10 remains in its rest position.

With 20, 21 and 22 are indicated respectively a first feed inlet, a second feed inlet and a third feed inlet, this latter formed in the closure plug 104, communicating respectively with the principal chambers 6, 7, 8.

With 23, 24 and 25 are indicated another three chambers lying within the interior of the cylindrical cavity 3. The chamber 23 is delimited by the walls of the portion 3e of the cylindrical cavity 3, by the wall 2c of the fixed body 2 and by the free end of the cylindrical axial appendage 9 of the first piston element. The chamber 23 communicates, by means of the duct 17, with the third main chamber 8. The chamber 24 lies between the inner wall of the cylindrical cavity 18a formed within the second piston element 5 and the outer wall of the portion 16b of the cylindrical axial stem 16 of the first piston element 4. The chamber 25 lies between the wall of the portion 3b of the cylindrical cavity 3 and the outer wall of the portion 5b of the second piston element 5. This chamber 25 communicates, by means of a duct 5c formed in the second piston element 5, with the chamber 24.

Figure 2:
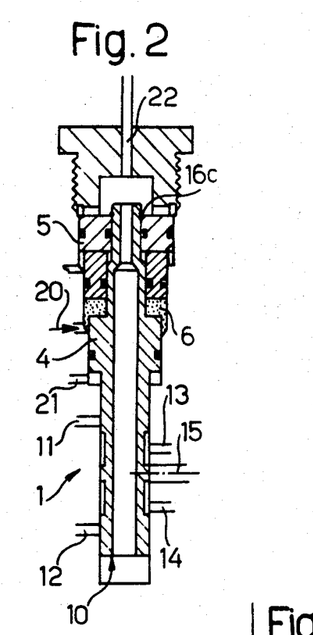
FIGS. 2 to 8 illustrate the seven different operating conditions which the control unit of FIG. 1 can adopt.

By directing fluid under pressure to one or more of the three feed inlets 20, 21, 22 according to the seven different possible combinations there are obtained the seven operating conditions of the control unit 1 illustrated in FIG. 2.

Of these seven operating conditions two are active, that is to say correspond to a displacement of the distributor valve 10 to its first working position or its second working position respectively; the other five operating conditions are passive, that is to say in correspondence to these the distributor valve 10 is maintained in its rest position.

Still referring to FIG. 1, to obtain the said operation it is necessary that the active surfaces of the piston elements 4, 5, intended to come into contact with the fluid under pressure have dimensions such as to satisfy determined ratios.

Defining more precisely:

A is the area of the free surface of the end of the cylindrical stem 16,

B is the cross sectional area of the portion 16a of the cylindrical stem 16,

C is the area of the free surface of the end of the cylindrical appendage 9,

D is the area of the annular surface of the end of the first piston element 4 which is adjacent to the second principal chamber 7, E is the area of the annular surface of the end of the first piston element 4 which is adjacent to the first principal chamber 6, F is the area of the annular surface of the end of the second piston element 5 which is adjacent to the first principal chamber 6, and G is the area of the annular surface of the end of the second piston element 5 which is adjacent to the third principal chamber 8, it is necessary, to obtain the above mentioned operation, that for a given value of the area A, the following relations have the values:

$$B = A + \alpha$$

$$C = B + \beta$$

$$D = \alpha + \gamma$$

$$E = D + \beta$$

$$F = E + \delta$$

$$G = F + \beta + \epsilon$$

wherein $\alpha$, $\beta$, $\gamma$, $\delta$, and $\epsilon$, are any positive values.

In practice it is convenient for $\alpha$, $\beta$, $\gamma$, $\delta$, and $\epsilon$ to be equal to one another and corresponding to the minimum value of the section necessary to cause the displacement of the various elements of the control unit for a given value of the feed pressure.

Figure 3:
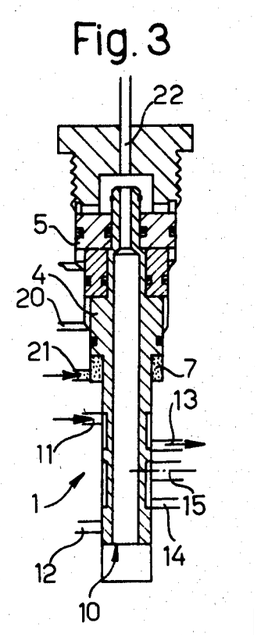
Figure 4:
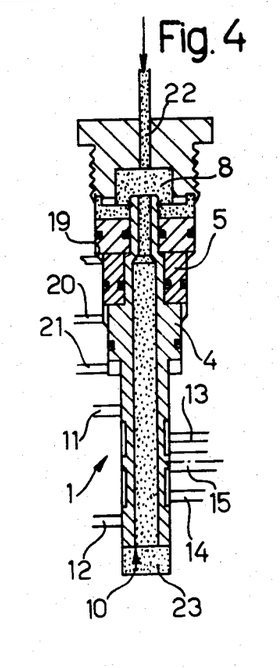
Figure 5:
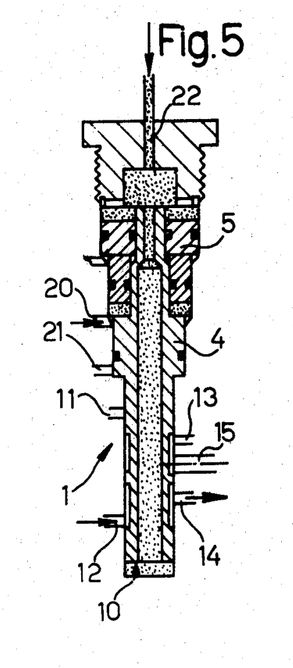

If the said relationships are valid, then the control unit 1 can have seven operating conditions:

a first active operating condition, illustrated in FIG. 3, which corresponds to the case in which the fluid under pressure is fed only to the second feed inlet of the control unit, in which the distributor valve 10 is displaced towards its first working position allowing connection between the inlet 11 and the outlet 13, a second active operating condition, illustrated in FIG. 5, corresponding to the case in which fluid under pressure is fed both to the first and the third feed inlet, in which the distributor valve 10 is displaced to its second working position putting into communication the inlet 12 and the outlet 14, and five passive operating conditions, illustrated in FIGS. 2, 4, 6, 7 and 8 corresponding to the other five possible feed conditions, in correspondence with which the distributor valve 10 is moved to or is maintained in its rest position.

What has been specified above can be easily verified by supposing that, for a given value of the area A, the areas of the other surfaces have the following values:

B=2A; C=3A; D=2A; E=3A; F=4A; G=6A

In the case of FIG. 2, the fluid under pressure is fed solely, via the feed inlet 20, to the principal chamber 6. Defining with p the value of the feed fluid pressure, the first piston element 4 is subject to a downward axial force equal to 3Ap, whilst the second piston element 5 is subjected to an upward axial force equal to 4Ap. Because the force acting on the piston element 5 is greater than that acting on the piston element 4, the second piston element 5 is displaced upwardly until it reaches its end position against the surface 44a of the closure plug 44; the first piston element 4, under the action of the said axial force is displaced downwardly on the other hand until the stop ring 16c rigidly connected to it is carried into contact with the adjacent end surface of the second piston element 5. Since the two piston elements 4 and 5 move in opposite directions, it follows, for the above reasons, that the distributor valve 10 is maintained in its rest position.

The operating condition illustrated in FIG. 3 corresponds to the case in which the fluid under pressure is fed through the feed inlet 21 to only the second principal chamber 7. In this case the second piston element 5 is not subject to any axial force, whilst the first piston element 4 is subjected to an upward force equal to 2Ap. Consequently both the piston elements 4, 5 reach their upper end positions causing the displacement of the distributor valve 10 to its first working position in which the inlet 11 and the outlet 13 are in communication.

The operating condition illustrated in FIG. 4 corresponds to the case in which fluid under pressure is fed only to the third feed inlet 22. In this case both the third principal chamber 8 and the chamber 23 are fed through the duct 17. On the basis of considerations analogous to the preceding ones it can be seen that in this case the second piston element 5 reaches its lower end position, against the shoulder 19, whilst the first piston element 4 reaches its position against the second piston element 5; in this case also, therefore, the distributor valve 10 is maintained in its rest position.

Figure 6:
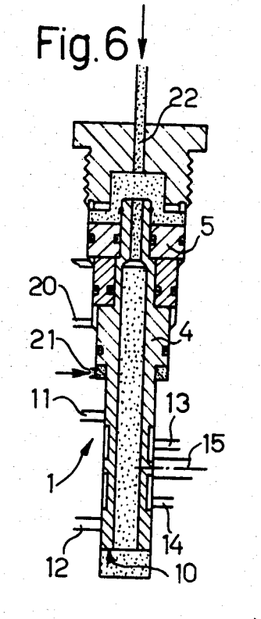
Figure 7:
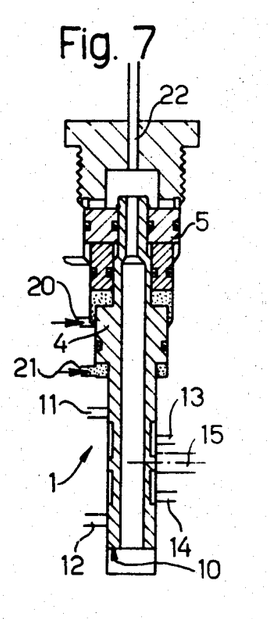
Figure 8:
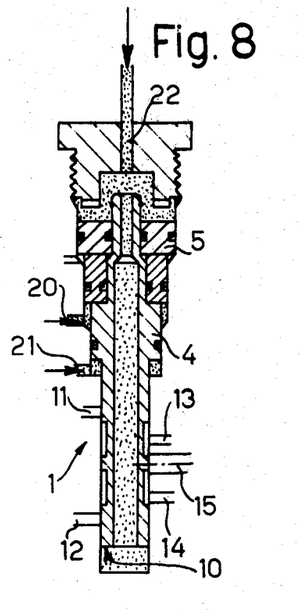

Still with analogous considerations it can be seen that the operating condition illustrated in FIG. 5, corresponding to the case in which fluid under pressure is fed both to the first and the third inlets, is an active operating condition in which the distributor valve is moved to its second working position establishing communication between the inlet 12 and the outlet 14. The other three operating conditions illustrated in FIGS. 6 to 8 are three passive conditions in which the distributor valve 10 is maintained in its first rest position.

Figure 9:
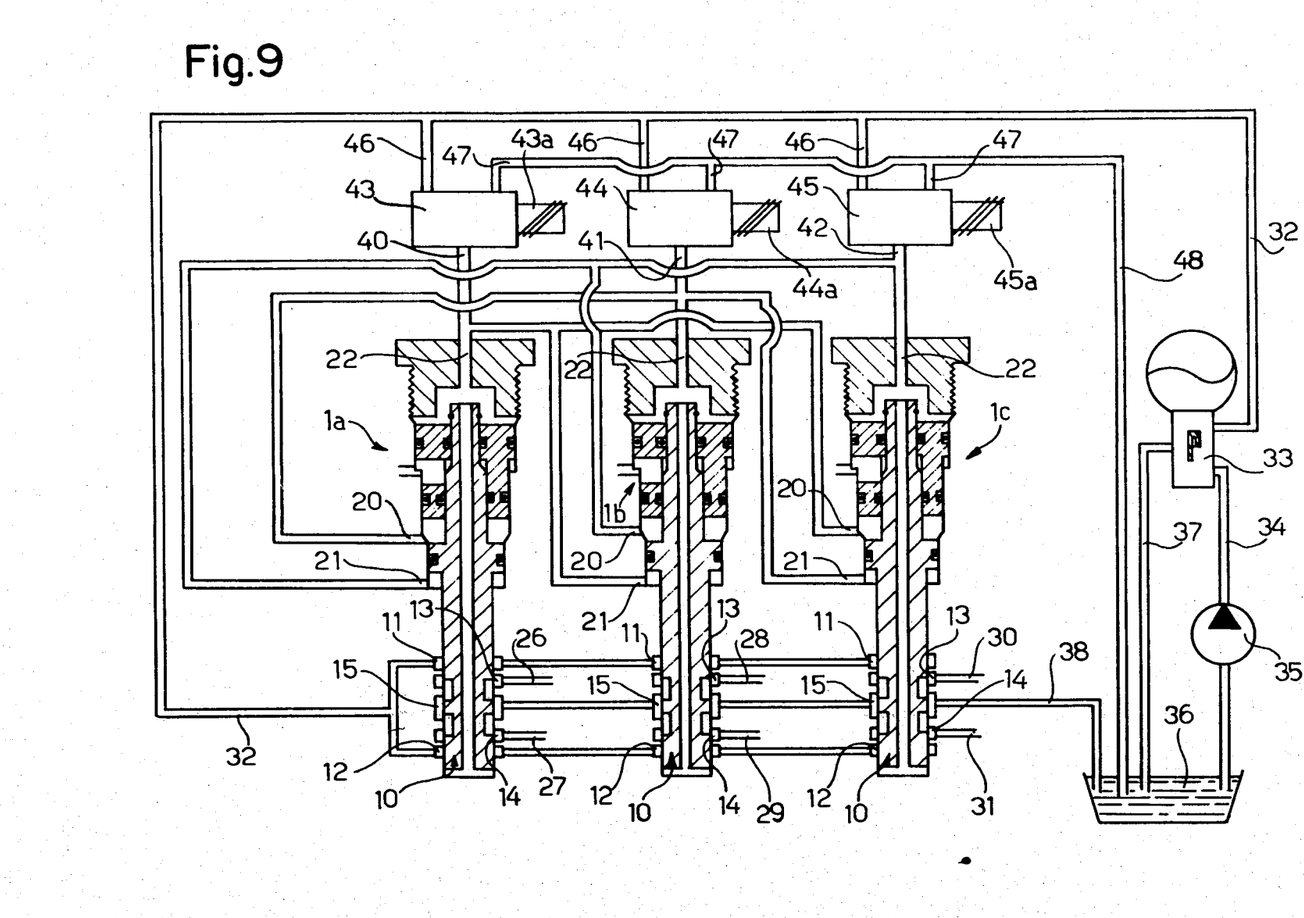
FIG. 9 illustrates a first embodiment of the device according to the present invention.

FIG. 9 illustrates a fluid control device according to the invention for the selective control of a group of three distributor valves 10 of the type illustrated with reference to FIG. 1. The three distributor valves 10 are controlled respectively by three control units 1a, 1b, 1c identical to the control unit illustrated in FIG. 1. With 26 and 27, 28 and 29, 30 and 31 are indicated respectively the three pairs of outlet ducts connected to the outlets 13, 14 of each distributor valve 10. The inlets 11, 12 of each distributor valve 10 are, on the other hand, connected to a feed duct 32 able to receive fluid under pressure from an accumulator 33. The accumulator 33 is fed by means of a duct 34 in which is inserted a pump 35 feeding from a reservoir 26. The accumulator 33 is also connected to the reservoir 36 by means of a discharge duct 37, through which discharges the excess flow from the pump 35. Finally, the outlets 15 of the distributor valves 10 are connected by means of a single duct 38 to the reservoir 36.

With 40 is indicated a first feed duct of the group of three control units 1a, 1b, 1c respectively connected to the feed inlet 22 of the control unit 1a, to the feed inlet 21 of the control unit 1b, and to the feed inlet 20 of the control unit 1c.

With 41 is indicated a second feed duct of the group of three control units 1a, 1b, 1c, connected to the feed inlet 20 of the control unit 1a, to the feed inlet 22 of the control unit 1b and to the feed inlet 20 of the control unit 1c.

With 42 is indicated a third feed duct of the group of three control units 1a, 1b, 1c connected to the feed inlet 21 of the control unit 1a, to the feed inlet 20 of the control unit 1b and to the feed inlet 22 of the control unit 1c.

To the three feed ducts 40, 41, 42 of the group of three control units 1a, 1b, 1c are respectively connected the outputs of three solenoid valves 43, 44, 45. These solenoid valves are of the normally closed type and are each connected by means of an inlet duct 46 to the feed duct 32 and by means of a discharge duct 47 to a discharge duct 48 connected to the reservoir 36.

The three solenoid valves 40, 41, 42 are provided respectively with control members 43a, 44a, 45a each constituted by a coil connected in an electrical control circuit. By acting on the coil it is possible to displace each solenoid valve between a "closed" position in which the respective duct 46 is closed and the respective duct 47 is connected to the output communicating with the feed duct of the group of three control units which is connected to the solenoid valve, and an "open" position in which the respective duct 46 is connected to the output communicating with the feed duct of the group of three control units which is connected to the solenoid valve.

By intervening on the control members of the three solenoid valves 43, 44, 45 it is therefore possible to feed fluid under pressure from one or more of the three feed ducts 40, 41, 42 according to the seven different combinations. Fluid under pressure can in fact be fed solely to any one of the three feed ducts, or else solely to any pair of feed ducts, or else to all three feed ducts.

In correspondence with each of the seven different feed conditions each control unit adopts one of the seven operating conditions described with reference to FIGS. 2 to 8.

More precisely, the following conditions occur: feeding fluid under pressure only to the feed duct 40 (solenoid valve 43 "open," solenoid valves 44, 45 "closed") causes displacement of the distributor valve 10 of the control unit 1b to its first working position in such a way as to direct fluid under pressure to the duct 28; the distributor valves of the control units 1a, 1c remain in their rest positions.

Sending fluid under pressure solely to the feed duct 41 (solenoid valve 44 "open," solenoid valves 43, 45 "closed") causes the displacement of the distributor valve 10 of the control unit 1c to its first working position in such a way as to feed fluid under pressure to the duct 30, whilst the distributor valves 10 of the control units 1a, 1b remain in their rest positions.

Sending fluid under pressure solely to the feed duct 42 (solenoid valve 45 "open", solenoid valves 43, 44 "closed") causes the displacement of the distributor valve 10 of the control unit 1a to its first working position in such a way as to feed fluid under pressure to the duct 26, whilst the distributor valves of the control units 1a, 1b remain in their rest positions.

Feeding fluid under pressure both to the feed duct 40 and to the feed duct 41 (solenoid valves 43, 44 "open", solenoid valve 45 "closed") causes the displacement of the distributor valve 10 of the control unit 1a to its second working position in such a way as to feed fluid under pressure to the duct 27, whilst the distributor valves 10 of the other two control units remain in their rest positions.

Sending fluid under pressure both to the feed duct 40 and to the feed duct 42 (solenoid valves 43, 45 "open", solenoid valve 44 "closed") causes a displacement of the distributor valve 10 of the control unit 1c to its second working position in such a way as to send fluid under pressure to the duct 31, whilst the distributor valves of the other two control units remain in their working positions.

Sending fluid under pressure to the feed duct 41 and to the feed duct 42 (solenoid valves 44, 45 "open", solenoid valve 43 "closed") causes the displacement of the distributor valve 10 of the control unit 1b to its second working position in such a way as to send fluid under pressure to the duct 29, whilst the distributor valves of the other two control units remain in their working positions.

Finally, sending fluid under pressure to all three of the feed ducts 40, 41, 42 (solenoid valves 43, 44, 45 "open") all three of the distributor valves 10 of the control units 1a, 1b, 1c remain in their rest position.

Once one of the distributor valve 10 has been positioned, the solenoid valves can remain de-energised until the moment when it is required to vary the position of that distributor valve.

By means of the device according to the invention it is possible therefore to control with only three solenoids the feeding of fluid under pressure to seven ducts intended to be connected to a utiliser.

The device according to the invention therefore has particular advantages from the point of view of the compactness of the components, of the reduction of the consumption of electrical energy for the control of the solenoid valves, and, moreover, makes it possible to avoid the sending of fluid under pressure to more than one duct contemporaneously; this characteristic is particularly advantageous in the case of application of the device according to the present invention to the control, for example, of a gear box for motor vehicles, in which it is desirable to avoid the contemporaneous engagement of more than one gear ratio.

Figure 10:
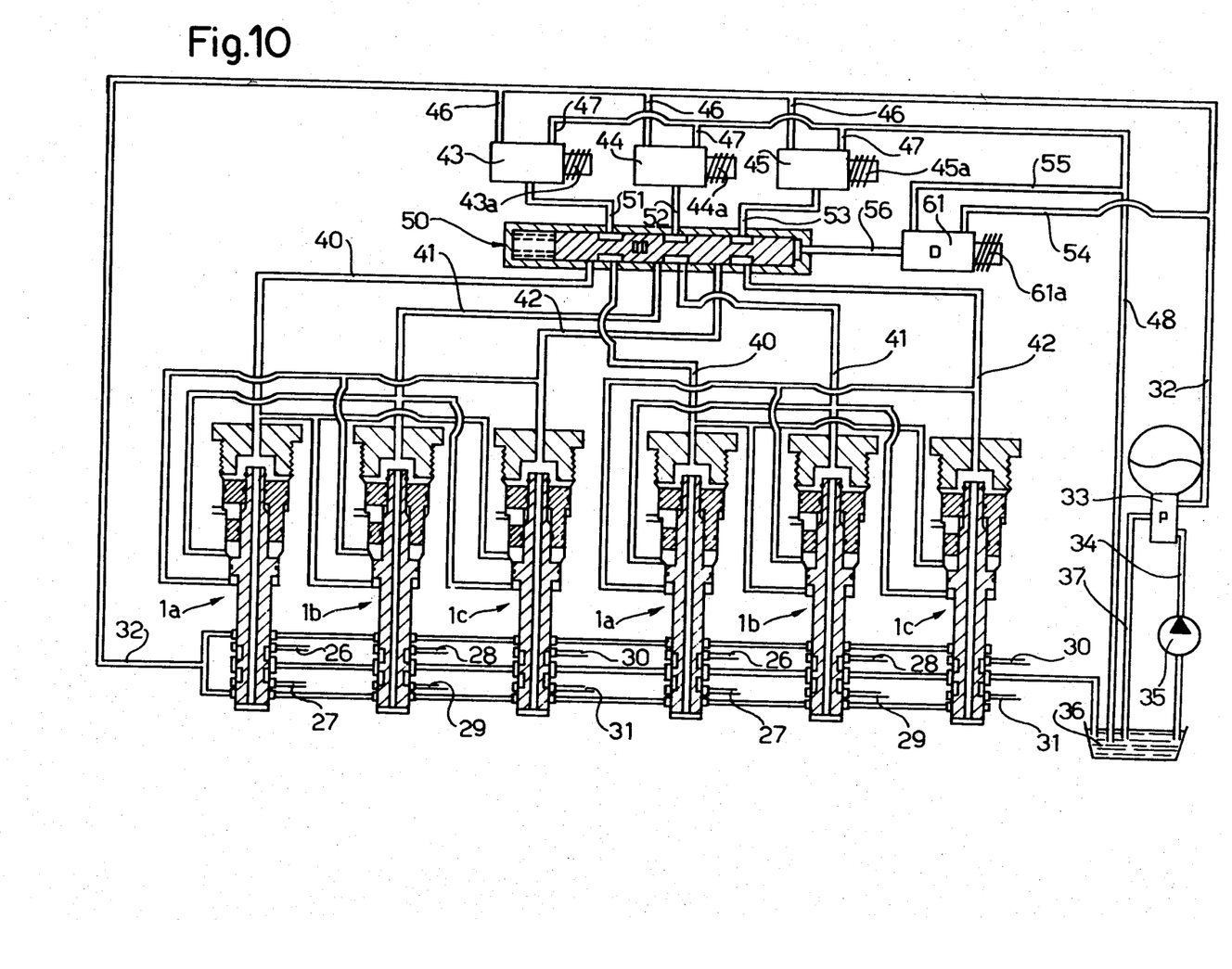
FIG. 10 illustrates a second embodiment of the device according to the present invention.

The device illustrated in FIG. 10 relates to the case in which it is desired to control two groups of three distributor valves. In this case each group of three distributor valves is controlled by a group of three control units identical to the group of three illustrated with reference to FIG. 9. The principal difference between the device illustrated in FIG. 10 and the device of FIG. 9 resides in the fact that the three feed ducts 40, 41, 42 of each group of three, instead of being connected directly to the three solenoid valves 43, 44, 45 are connected to a distributor member 50 controlled by a fourth solenoid valve 61, which in its turn is connected, by means of three ducts 51, 52, 53, to the three outputs of the three solenoid valves 43, 44, 45.

The solenoid valve 61 is provided with an inlet duct 54 fed from the duct 32, with a discharge duct 55 connected to the duct 48, and with an output duct 56 which controls the operation of the distributor member 50.

By acting on the control coil 61a of the solenoid valve 61 it is possible to displace this solenoid valve between a "closed" position, in which the ducts 56 and 55 are communicating, and an "open" position in which the duct 54 communicates with the duct 56. In correspondence with these two positions the distributor member 50 connects the three outputs 51, 52, 53 of the solenoid valves 43, 44, 45 selectively with the three feed ducts of one of the two groups of three control units.

Each control unit can be controlled by means of the three solenoid valves in a manner analogues to that described with reference to FIG. 9 in such a way as to dispose it in one of the said seven configurations. For each of these seven configurations the other control unit can also be disposed in one of the said seven configurations. Therefore the system illustrated in FIG. 8 can assume forty nine different configurations.

In conclusion, by acting on the control members of the solenoid valves 43, 44, 45 and 51 it is possible to control the feeding of fluid under pressure to the twelve outlet ducts connected to the two groups of three control units.

A possible extension of the device according to the present invention is constituted by the use of six groups of three control units, each group of three for the control of six outlet ducts, the said six groups of three being connected to the three solenoid valves 43, 44, 45 by means of a distributor member which in its turn is constituted by a group of three identical to that described with reference to FIG. 9. In this case the system could assume $7^6$ different configurations, that is to say 117,649 different configurations.

Although the accompanying drawings relate to the case in which each of the control units controls the displacement of a distributor valve, the said control unit could in the same way control the displacement of a mechanical member able to assume two different working positions.

The term "fluid" adopted in the preceding description and in the claims which follow is intended to be indicative of any fluid means, such as oil, water or air.

Naturally, the principle of the invention remaining the same, the details of construction and the embodiments can be widely varied with respect to what has been described and illustrated purely by way of example, without by this departing from the scope of the present invention.

We claim:

1. In a fluid control device for the selective control of at least one group of three movable members each displaceable between a first working position and a second working position, and each having a rest position intermediate between the first and second working positions, the improvement wherein:
   (a) said fluid control device comprises, for each group of three movable members, a group of three control units, each control unit being intended to control a respective movable member,
   (b) each control unit comprises a fixed body provided internally with a cylindrical cavity closed at its ends, a first piston element rigidly connected with the movable member controlled by the said control unit and a second piston element; the said two piston elements being slidably mounted within the cavity of the fixed body in such a way as to define three principal chambers within the said cavity;
   a first principal chamber lying between the two piston elements,
   a second principal chamber adjacent only the first piston element, and
   a third principal chamber adjacent only the second piston element;
   each control unit being moreover provided with a first, a second and a third feed inlet, respectively communicating with the first, the second and the third principal chamber to provide seven different feed conditions,
   (c) the two piston elements of each control unit are formed in such a way that each control unit controls, in a first active operating condition, corresponding to one of said seven different feed conditions of fluid under pressure to one or more of the three feed inlets, a displacement of the respective movable member towards its first working position, and, in a second active operating condition, corresponding to another of said seven different feed conditions, a displacement of the respective movable member towards its second working position; each hydraulic control unit being operable to maintain the respective movable member in its rest position in the passive operating conditions corresponding to the other five different feed conditions of fluid under pressure to the three feed inlets,
   (d) each group of three control units is provided with a first, a second and a third feed duct, each of which is connected both to the first feed inlet of one of the three units of the group of three and to the second feed inlet of another unit of the group of three and to the third feed inlet of the remaining unit of the group of three; each feed inlet of each control unit being connected only to one of the said three feed ducts,
   (e) there are provided control means to control the feeding of a fluid under pressure coming from a feed source to each of the three feed ducts of each group of three control units the said control means being operable to allow the feeding of fluid under pressure to, or the discharge of fluid under pressure from, each of the three feed ducts of each group of three control units.

2. A fluid control device as set forth in claim 1, for the selective control of a single group of three movable members, wherein said control means comprise a group of three valves, each of which is provided with an inlet duct connected to the said feed source, a discharge duct and an output duct;
   each valve being moreover provided with a control member for putting into communication, in a first operative condition of the control member, the output duct and the discharge duct of the said valve and, in a second operative condition of the control member, the inlet duct and the output duct of the said valve.

3. A fluid control device as set forth in claim 2, wherein said three valves are three solenoid valves of the normally closed type, and the control member of each solenoid valve is constituted by a coil connected in an electrical control circuit.

4. A fluid control device as set forth in claim 2, wherein each of the movable members is constituted by a distributor valve operable to allow the feeding from a source of fluid under pressure to a first outlet duct in its first working position and to a second outlet duct in its second working position.

5. A fluid control device as set forth in claim 4, wherein the source of fluid under pressure which feeds each distributor valve is the same fluid pressure source that feeds the three valves the device.

6. A fluid control device as set forth in claim 1, for the selective control of a plurality of groups of three movable members, wherein said control means comprise a group of three valves, each of which is provided with an inlet duct connected to the said feed source, a discharge duct and an outlet duct; each valve being moreover provided with a control member for putting into communication, in a first operative condition of the control member, the outlet duct and the discharge duct of the said valve, and, in a second operative condition of the control member, the inlet duct and the outlet duct of the said valve; the said control means further including a distributor member,
- connected to the three outlet ducts of the three valves and to the three feed ducts of each group of three control units,
- and operable to put selectively into communication the three outlet ducts of the three valves with the three feed ducts of one of the groups of three control units.

7. A fluid control device as set forth in claim 6, wherein said three valves are three solenoid valves of the normally closed type, and the control member of each solenoid valve is constituted by a coil connected in an electrical control circuit, said distributor member being also electrically controlled.

8. A fluid control device as set forth in claim 7, wherein the distributor member is constituted by a distributor valve, the said device further including a fourth solenoid valve fed from the said source of fluid under pressure and connected to the said distributor valve for the control of this latter.

9. A fluid control device as set forth in claim 1, wherein:
   (a) the first piston element is provided centrally on its end surface adjacent the second principal chamber with a cylindrical axial appendage slidable in a portion of restricted diameter of the cylindrical cavity of the fixed body of the said control unit,
   this first piston element being moreover provided centrally, on its end surface which is adjacent to the first principal chamber, with a second axial appendage in the form of a cylindrical stem having a first portion of greater diameter, adjacent to the said first piston element and a second portion of smaller diameter; the said first piston element being moreover provided with an axial duct extending from the free end of the said cylindrical appendage to the free end of the said cylindrical stem,
   (b) the second piston element comprises a first portion of smaller diameter, adjacent to the first principal chamber, and a second portion of greater diameter, the said portions being slidable respectively in two contiguous portions of different diameter of the said cylindrical cavity of the fixed body; such second piston element being moreover provided centrally with a cylindrical axial duct having two portions of different diameter within which are respectively slidable the said two portions of the cylindrical stem of the first piston element; the free end of the said cylindrical stem of the first piston element being disposed outside the second piston element slidable on it and being provided with a stop collar able to come into contact with the end surface of such second piston element which is facing the third principal chamber,
   (c) the axial stroke of the second piston element with respect to the body and the axial stroke of the first piston element with respect to the second piston element are equal to half the axial stroke which the respective movable member must make to move from its rest position to one of its two working positions,
   (d) the values of the areas of the active surfaces of the two piston elements which are intended to come into contact with fluid under pressure are chosen in such a way that each control unit, in its first active operating condition causes a displacement of the respective movable member towards its first working position, in its said second active operating condition causes a displacement of the respective movable member towards its second working position, and in its other five passive operating conditions maintains the respective movable member in its rest position.

10. A fluid control device as set forth in clam 9, wherein for a given value of the area A of the free surface of the end of the cylindrical stem, the area B of the transverse section of the portion of greater diameter of the cylindrical stem, the area C of the free surface of the end of the cylindrical appendage, the area D of the annular surface at the end of the first piston element facing the second principal chamber, the area E of the annular surface at the end of the first piston element facing the first principal chamber, the area F of the annular surface at the end of the second piston element facing the first principal chamber, and the area G of the annular surface at the end of the second piston element facing the third principal chamber satisfy the following relations:

$$B = A + \alpha$$

$$C = B + \beta$$

$$D = \alpha + \gamma$$

$$E = D + \beta$$

$$F = E + \delta$$

$$G = F + \beta + \epsilon$$

where $\alpha, \beta, \gamma, \delta$, and $\epsilon$ are any positive valves.

* * * * *